US006996392B2

(12) United States Patent
Anderson et al.

(10) Patent No.: US 6,996,392 B2
(45) Date of Patent: Feb. 7, 2006

(54) E911 OVERLAY SOLUTION FOR GSM, FOR USE IN A WIRELESS LOCATION SYSTEM

(75) Inventors: Robert J. Anderson, Phoenixville, PA (US); Joseph W. Sheehan, Newtown Square, PA (US)

(73) Assignee: Trueposition, Inc., Berwyn, PA (US)

( * ) Notice: Subject to any disclaimer, the term of this patent is extended or adjusted under 35 U.S.C. 154(b) by 402 days.

(21) Appl. No.: 10/234,363

(22) Filed: Sep. 3, 2002

(65) Prior Publication Data

US 2004/0203429 A1    Oct. 14, 2004

(51) Int. Cl.
H04M 11/04    (2006.01)

(52) U.S. Cl. ............................. 455/404.2; 455/456.1; 455/521

(58) Field of Classification Search ............... 455/455, 455/456.1, 456.2, 456.3, 414.1, 450, 451, 455/452.2, 453, 404.2, 457, 552.1, 521, 404.1; 379/45, 47; 342/450
See application file for complete search history.

(56) References Cited

U.S. PATENT DOCUMENTS

| | | | |
|---|---|---|---|
| 4,728,959 A | 3/1988 | Maloney et al. ............ 342/457 |
| 5,327,144 A | 7/1994 | Stilp et al. .................. 342/387 |
| 5,608,410 A | 3/1997 | Stilp et al. .................. 342/387 |
| 5,732,125 A * | 3/1998 | Oyama ..................... 455/404.1 |
| 5,933,777 A * | 8/1999 | Rahman ..................... 455/450 |
| 5,959,580 A | 9/1999 | Maloney et al. ............ 342/457 |
| 6,047,192 A | 4/2000 | Maloney et al. ............ 455/456 |
| 6,091,362 A | 7/2000 | Stilp et al. .................. 342/465 |
| 6,097,336 A | 8/2000 | Stilp ..................... 342/357.02 |
| 6,101,178 A | 8/2000 | Beal ........................... 370/336 |
| 6,108,555 A | 8/2000 | Maloney et al. ............ 455/456 |

(Continued)

OTHER PUBLICATIONS

GSM (Global System for Mobile Communications), ETSI EN 300 940 V7.4.2 (Sep. 2000), "Digital Cellular Telecommunications System (Phase 2 +); Mobile Radio Interface Layer 3 Specification (GSM 04.08 Version 7.4.2 Release 1998)," 1998, 1-628.

Primary Examiner—Urban Edward
Assistant Examiner—Dai Phuong
(74) Attorney, Agent, or Firm—Woodcock Washburn LLP (57) ABSTRACT

In a network overlay Location Services solution for a GSM communications network, the LMU monitors the uplink and/or downlink control channels and determines which call originations are for E911 emergencies and which call setup (Stand-alone Dedicated Control Channel, or SDCCH), assigned traffic (TCH) and associated (Slow Associated Control Channel, or SACCH) channels are subsequently assigned. Capturing the energy on the call setup channel, SDCCH, and its associated SACCH will typically provide a sub-100 meter level of accuracy. If not, the SMLC can redirect the LMU to the assigned traffic channel, TCH, to capture additional RF energy and improve the location accuracy as required. This approach takes advantage of the fact that Channel Request messages on the RACH include an information element that indicates the purpose for the access request. One of the values of this information element identifies that the Channel Request is for an emergency call. By monitoring the Access Grant channels (downlink), e.g., the AGCH, the primary (serving) LMU (LMU 200A in FIG. 1) can capture the Immediate Assignment Message (IMM ASS) for emergency calls. The Immediate Assignment Message contains the Channel Request message (with the emergency call indication) and the SDCCH channel to be used by the MS for subsequent call setup messaging. The primary LMU will forward the Immediate Assignment Message to the SMLC, which will task the cooperating LMUs to collect the RF energy from the associated SDCCH, SACCH and TCH channels and provide TDOA, AoA, and FDOA determinations.

74 Claims, 6 Drawing Sheets

U.S. PATENT DOCUMENTS

| | | | |
|---|---|---|---|
| 6,115,599 A | 9/2000 | Stilp | 455/404 |
| 6,119,013 A | 9/2000 | Maloney et al. | 455/456 |
| 6,127,975 A | 10/2000 | Maloney | 342/457 |
| 6,172,644 B1 | 1/2001 | Stilp | 342/457 |
| 6,184,829 B1 | 2/2001 | Stilp | 342/387 |
| 6,198,914 B1 * | 3/2001 | Saegusa | 455/404.2 |
| 6,266,013 B1 | 7/2001 | Stilp et al. | 342/387 |
| 6,281,834 B1 | 8/2001 | Stilp | 342/174 |
| 6,285,321 B1 | 9/2001 | Stilp et al. | 342/465 |
| 6,288,675 B1 | 9/2001 | Maloney | 342/457 |
| 6,288,676 B1 | 9/2001 | Maloney | 342/457 |
| 6,317,081 B1 | 11/2001 | Stilp | 342/387 |
| 6,317,604 B1 | 11/2001 | Kovach, Jr. et al. | 455/456 |
| 6,334,059 B1 | 12/2001 | Stilp et al. | 455/456 |
| 6,351,235 B1 | 2/2002 | Stilp | 342/357.06 |
| 6,366,241 B2 | 4/2002 | Pack et al. | 342/442 |
| 6,388,618 B1 | 5/2002 | Stilp et al. | 342/457 |
| 6,400,320 B1 | 6/2002 | Stilp et al. | 342/457 |
| 6,421,009 B2 * | 7/2002 | Suprunov | 342/465 |
| 6,434,377 B1 * | 8/2002 | Penttinen | 455/404.1 |
| 6,684,056 B1 * | 1/2004 | Emmons, Jr. et al. | 455/12.1 |
| 6,865,165 B1 * | 3/2005 | Huttunen | 370/329 |
| 2002/0005804 A1 * | 1/2002 | Suprunov | 342/457 |
| 2002/0065063 A1 * | 5/2002 | Uhlik et al. | 455/404 |
| 2003/0064734 A1 * | 4/2003 | Stilp et al. | 455/456 |
| 2004/0203844 A1 * | 10/2004 | Rajkotia | 455/457 |
| 2004/0266457 A1 * | 12/2004 | Dupray | 455/456.1 |

* cited by examiner

E911 OVERLAY SOLUTION FOR GSM, FOR USE IN A WIRELESS LOCATION SYSTEM

BACKGROUND OF THE INVENTION

Early work relating to the field of Wireless Location has been described in U.S. Pat. Nos. 5,327,144, Jul. 5, 1994, "Cellular Telephone Location System"; and U.S. Pat. No. 5,608,410, Mar. 4, 1997, "System for Locating a Source of Bursty Transmissions." Both patents are owned by the assignee of the present invention.

FIELD OF THE INVENTION

The present invention relates generally to the field of wireless location systems, and more particularly to an E911 network overlay solution for GSM.

The assignee has conducted extensive experiments with Wireless Location System technology to demonstrate both the viability and value of the technology. For example, several experiments were conducted during several months of 1995 and 1996 in the cities of Philadelphia and Baltimore to verify the system's ability to mitigate multipath in large urban environments. Then, in 1996 the assignee constructed a system in Houston that was used to test the technology's effectiveness in that area and its ability to interface directly with E911 systems. Then, in 1997, the system was tested in a 350 square mile area in New Jersey and was used to locate real 9-1-1 calls from real people in trouble. The system test was then expanded to include 125 cell sites covering an area of over 2,000 square miles. In 1998, the assignee added digital radio capability to the WLS and fielded multiple dual-mode test systems including: a 16 site AMPS/TDMA system in Wilmington Del., a 7 site AMPS/TDMA system in Redmond Wash., a 38 site rural AMPS/TDMA system around Fort Wayne, Ind., a 19 site AMPS/CDMA system in King of Prussia Pa., a 33 site dense urban AMPS/CDMA system on Manhattan Island in New York, and a 135 site AMPS/CDMA system in New Jersey, Delaware and Pennsylvania. The assignee is currently in the process of deploying a commercial 8,000 site nationwide AMPS/TDMA system to be completed by June 2003. During all of these tests and commercial deployments, various techniques were tested for effectiveness and further developed, and the system was demonstrated to overcome the limitations of other approaches that have been proposed for locating wireless telephones.

The value and importance of the Wireless Location System has been acknowledged by the wireless communications industry. In June 1996, the Federal Communications Commission issued requirements for the wireless communications industry to deploy location systems for use in locating wireless 9-1-1 callers, with a deadline of October 2001. The location of wireless 9-1-1 callers will save response time, save lives, and save enormous costs because of reduced use of emergency response resources. In addition, numerous surveys and studies have concluded that various wireless applications, such as location sensitive billing, fleet management, and others, will have great commercial value in the coming years.

The assignee of the present invention has continued to develop systems and techniques to further improve the accuracy of Wireless Location Systems while significantly reducing the cost of these systems. For example, the following commonly-assigned patents have been awarded for various improvements in the field of Wireless Location:

1. U.S. Pat. No. 6,400,320, Jun. 4, 2002, Antenna Selection Method For A Wireless Location System;
2. U.S. Pat. No. 6,388,618, May 14, 2002, Signal Collection System For A Wireless Location System;
3. U.S. Pat. No. 6,351,235, Feb. 26, 2002, Method And System For Synchronizing Receiver Systems Of A Wireless Location System;
4. U.S. Pat. No. 6,317,081, Nov. 13, 2001, Internal Calibration Method For Receiver System Of A Wireless Location System;
5. U.S. Pat. No. 6,285,321, Sep. 4, 2001, Station Based Processing Method For A Wireless Location System;
6. U.S. Pat. No. 6,334,059, Dec. 25, 2001, Modified Transmission Method For Improving Accuracy For E-911 Calls;
7. U.S. Pat. No. 6,317,604, Nov. 13, 2001, Centralized Database System For A Wireless Location System;
8. U.S. Pat. No. 6,281,834, Aug. 28, 2001, Calibration For Wireless Location System;
9. U.S. Pat. No. 6,266,013, Jul. 24, 2001, Architecture For A Signal Collection System Of A Wireless Location System;
10. U.S. Pat. No. 6,184,829, Feb. 6, 2001, Calibration For Wireless Location System;
11. U.S. Pat. No. 6,172,644, Jan. 9, 2001, Emergency Location Method For A Wireless Location System;
12. U.S. Pat. No. 6,115,599, Sep. 5, 2000, Directed Retry Method For Use In A Wireless Location System;
13. U.S. Pat. No. 6,097,336, Aug. 1, 2000, Method For Improving The Accuracy Of A Wireless Location System;
14. U.S. Pat. No. 6,091,362, Jul. 18, 2000, Bandwidth Synthesis For Wireless Location System;
15. U.S. Pat. No. 5,608,410, Mar. 4, 1997, System For Locating A Source Of Bursty Transmissions; and
16. U.S. Pat. No. 5,327,144, Jul. 5, 1994, Cellular Telephone Location System.

Other exemplary patents in this field include:
1. U.S. Pat. No. 6,366,241, Apr. 2, 2002, Enhanced Determination Of Position-Dependent Signal Characteristics;
2. U.S. Pat. No. 6,288,676, Sep. 11, 2001, Apparatus And Method For Single Station Communications Localization;
3. U.S. Pat. No. 6,288,675, Sep. 11, 2001, Single Station Communications Localization System;
4. U.S. Pat. No. 6,047,192, Apr. 4, 2000, Robust, Efficient, Localization System;
5. U.S. Pat. No. 6,108,555, Aug. 22, 2000, Enhanced Time Difference Localization System;
6. U.S. Pat. No. 6,101,178, Aug. 8, 2000, Pseudolite-Augmented GPS For Locating Wireless Telephones;
7. U.S. Pat. No. 6,119,013, Sep. 12, 2000, Enhanced Time-Difference Localization System;
8. U.S. Pat. No. 6,127,975, Oct. 3, 2000, Single Station Communications Localization System;
9. U.S. Pat. No. 5,959,580, Sep. 28, 1999, Communications Localization System; and
10. U.S. Pat. No. 4,728,959, Mar. 1, 1988, Direction Finding Localization System.

Over the past few years, the cellular industry has increased the number of air interface protocols available for use by wireless telephones. The industry has also increased the number of frequency bands in which wireless or mobile telephones may operate, and has expanded the number of terms that refer or relate to mobile telephones to include "personal communications services", "wireless", and others. The changes in terminology and increases in the number of air interface protocols do not change the basic principles and inventions discovered and enhanced by the assignee of the present invention.

As mentioned, there are numerous air interface protocols used for wireless communications systems. These protocols are used in different frequency bands, both in the U.S. and internationally. The frequency band generally does not impact the Wireless Location System's effectiveness at locating wireless telephones.

All air interface protocols use two types of "channels". The first type includes control channels that are used for conveying information about the wireless telephone or transmitter, for initiating or terminating calls, or for transferring bursty data. For example, some types of short messaging services transfer data over the control channel. In different air interfaces, control channels are known by different terminology but the use of the control channels in each air interface is similar. Control channels generally have identifying information about the wireless telephone or transmitter contained in the transmission. The second type of channel includes voice channels, also known as traffic channels, that are typically used for conveying voice communications over the air interface. These channels are used after a call has been set up using the control channels. Voice channels will typically use dedicated resources within the wireless communications system whereas control channels will use shared resources. This distinction can make the use of control channels for wireless location purposes more cost effective than the use of voice channels, although there are some applications for which regular location on the voice channel is desired. Voice channels generally do not have identifying information about the wireless telephone or transmitter in the transmission.

Some of the differences in the air interface protocols are discussed below:

AMPS—This is the original air interface protocol used for cellular communications in the U.S. In the AMPS system, separate dedicated channels are assigned for use by control channels (RCC). According to the TIA/EIA Standard IS-553A, every control channel block must begin at cellular channel 313 or 334, but the block may be of variable length. In the U.S., by convention, the AMPS control channel block is 21 channels wide, but the use of a 26-channel block is also known. A reverse voice channel (RVC) may occupy any channel that is not assigned to a control channel. The control channel modulation is FSK (frequency shift keying), while the voice channels are modulated using FM (frequency modulation).

N-AMPS—This air interface is an expansion of the AMPS air interface protocol, and is defined in EIA/TIA standard IS-88. The control channels are substantially the same as for AMPS, but the voice channels are different. The voice channels occupy less than 10 KHz of bandwidth, versus the 30 KHz used for AMPS, and the modulation is FM.

TDMA—This interface is also known D-AMPS, and is defined in EIA/TIA standard IS-136. This air interface is characterized by the use of both frequency and time separation. Control channels are known as Digital Control Channels (DCCH) and are transmitted in bursts in timeslots assigned for use by DCCH. Unlike AMPS, DCCH may be assigned anywhere in the frequency band, although there are generally some frequency assignments that are more attractive than others based upon the use of probability blocks. Voice channels are known as Digital Traffic Channels (DTC). DCCH and DTC may occupy the same frequency assignments, but not the same timeslot assignment in a given frequency assignment. DCCH and DTC use the same modulation scheme, known as $\pi/4$ DQPSK (differential quadrature phase shift keying). In the cellular band, a carrier may use both the AMPS and TDMA protocols, as long as the frequency assignments for each protocol are kept separated.

CDMA—This air interface is defined by EIA/TIA standard IS-95A. This air interface is characterized by the use of both frequency and code separation. However, because adjacent cell sites may use the same frequency sets, CDMA is also characterized by very careful power control. This careful power control leads to a situation known to those skilled in the art as the near-far problem, which makes wireless location difficult for most approaches to function properly (but see U.S. Pat. No. 6,047,192, Apr. 4, 2000, Robust, Efficient, Localization System, for a solution to this problem). Control channels are known as Access Channels, and voice channels are known as Traffic Channels. Access and Traffic Channels may share the same frequency band but are separated by code. Access and Traffic Channels use the same modulation scheme, known as OQPSK.

GSM—This air interface is defined by the international standard Global System for Mobile Communications. Like TDMA, GSM is characterized by the use of both frequency and time separation. The channel bandwidth is 200 KHz, which is wider than the 30 KHz used for TDMA. Control channels are known as Standalone Dedicated Control Channels (SDCCH), and are transmitted in bursts in timeslots assigned for use by SDCCH. SDCCH may be assigned anywhere in the frequency band. Voice channels are known as Traffic Channels (TCH). SDCCH and TCH may occupy the same frequency assignments but not the same timeslot assignment in a given frequency assignment. SDCCH and TCH use the same modulation scheme, known as GMSK. The GSM General Packet Radio Service (GPRS) and Enhanced Data rates for GSM Evolution (EDGE) systems reuse the GSM channel structure, but can use multiple modulation schemes and data compression to provide higher data throughput.

Within this specification, a reference to control channels or voice channels shall refer to all types of control or voice channels, whatever the preferred terminology for a particular air interface. Moreover, there are many more types of air interfaces (e.g., IS-95 CDMA, CDMA 2000, and UMTS WCDMA) used throughout the world, and, unless the contrary is indicated, there is no intent to exclude any air interface from the inventive concepts described within this specification. Indeed, those skilled in the art will recognize other interfaces used elsewhere are derivatives of or similar in class to those described above.

SUMMARY OF THE INVENTION

The present invention is particularly directed to a network overlay Location Services solution for a GSM communications network. The GSM network is fully specified by the European Telecommunications Standards Institute (ETSI) and extended by the 3rd Generation Partnership Project (3GPP) since December 1998. Detailed descriptions of Radio messages, message elements, and parameters can be found in the specification GSM 04.08 or in UMTS documents 24.008 and 44.008. Message names used herein are as per GSM 04.08 Phase 2+, Version 7.4.2 Release 1998. The ETSI defined term LMU (Location Mobile Unit) is basically equivalent to the ANSI defined term Position Determining Unit (PDE) or to the Signal Collection System (SCS) term as used in the cited TruePosition Patents.

In the inventive solution, the LMU, independently from the installed GSM voice or voice/data network, detects an emergency call, determines channel assignments, and collects the mobile station's (MS's) radio frequency emissions for a time difference of arrival (TDOA) and/or angle of Arrival (AoA) location determination as described, for example, in the '959, '144, '013, '555 and '192 patents cited above, although the invention is by no means limited to these particular methods of determining TDOA and AoA information. Additionally frequency difference of arrival (FDOA) can be performed for signal grooming and estimation of the emitter's speed and heading.

For the embodiment detailed herein, the term LMU is used to describe a radio receiver station. The abbreviation "WLS" refers to the overlaid Wireless Location System inclusive of the control channel sensor, the Serving Mobile Location Center (SMLC) and any LMUs deployed. The term "sensor", "monitor", or "WLS Sensor" refer to a receiver capable of monitoring and demodulating control channel messages. "Primary LMU" is used to denote a receiver station co-located with the control channel sensor, thus taking advantage of a common power supply, communications backhaul and installation facility. The terms "Secondary LMU" and "Cooperating LMU" are used to describe any LMU not co-located with the sensor participating in the location estimation.

Emergency Call Determination

To autonomously locate an Emergency call in a GSM network, the WLS first determines that an emergency call is being placed. The GSM specification describes parameters or elements within standard control channel messages or messages unique to emergency services calls that are available to the WLS Sensor on either or both the uplink (mobile station to base transceiver stations (BTS)) or downlink (BTS to MS) GSM control channels.

For a WLS with a purely uplink radio monitoring capability, an emergency services call indication is first available in the "Channel Request" message broadcast by the MS on the Random Access Channel (RACH). The emergency services call indication is present later in the same call carried in the uplink Standalone Dedicated Control Channel (SDCCH) in the "CM Service Request" radio message. As can be seen, an uplink-only monitor could have a single narrowband receiver-to-RACH ratio or could have multiple narrowband receivers or a single wideband receiver dedicated to each SDCCH in its coverage area to autonomously detect an emergency services call in progress. Additionally, the dialed digits (commonly 9-1-1 or 1-1-2) present in the "SETUP" can be used by the WLS with uplink monitoring capability for identification of an emergency call in progress. Of course, use of the "Emergency SETUP" in the call itself is in itself an indication of an emergency call in progress.

For a WLS with only a downlink radio monitoring capability, the emergency services call indication is first present on the downlink direction in the "Immediate Assign" message sent on the Access Grant Channel (AGCH). Later in the same call, the emergency services call indication is available on the "CM Service Request" on the SDCCH. As can be seen, a downlink radio monitor could have a number of narrowband receivers, in a 1 receiver-to-AGCH ratio, or a wideband receiver.

For a WLS with both uplink and downlink radio monitoring capability and either a wideband receiver or multiple narrowband receivers, detection of an emergency services call via the emergency services call indication can happen earliest via detection and demodulation of the RACH borne "Channel Request" message. This early detection would allow for scheduling of scarce receiver resources to later channel assignment determination.

SDCCH Channel Detection

Once the WLS has identified that an emergency services call is in progress with its radio monitoring ability, the WLS determines the channel assignment of the MS before RF emission collection can begin.

For an uplink-only monitoring WLS, the SDCCH assignment is determined by monitoring all SDCCH's in the WLS coverage area. The uplink "CM Service Request" radio message, which is the first uplink message on the SDCCH, contains the indicator for an emergency services call. The WLS could determine both the SDCCH and the presence of the emergency services call indication by monitoring and demodulating a single message at the expense of dedicated receivers and demodulators or use of a wideband receiver with powerful signal processing capability.

For a WLS with a downlink-only monitoring capability, the first downlink radio message, "Immediate Assign", transmitted on the AGCH, contains the SDCCH assignment as well as the emergency services call indication. Alternatively, if the WLS is monitoring all downlink SDCCH's present in the coverage area, the existence of the downlink "CM Service Request" message carrying an emergency services call indication could be used for SDCCH assignment for an emergency services call.

For a WLS with uplink and downlink monitoring capability, the first downlink radio message, "Immediate Assign", transmitted on the AGCH, contains both the SDCCH assignment and an emergency services call indication. Since this WLS Sensor can determine from monitoring the uplink RACH that an emergency call is in progress, limited narrowband receiver resources could be utilized optimally by tuning a downlink receiver to the AGCH in time to catch the "Immediate Assign" message and thus determine the SDCCH.

SDCCH Radio Emission Collection

Once the WLS is aware of the emergency call and the SDCCH assignment of the emergency call, the SDCCH channel information can be distributed via the SMLC to co-operating LMUs. Co-operating LMU selection can be accomplished using pre-determined, static data or dynamically from signal strength and signal quality measurements. Additional signal processing gains are possible by techniques such as signal correlation or matched signal replica processing. Once all LMUs are tasked and scheduled, collection of RF energy for the purposes of location can occur. RF Emission collection by the LMU takes place only on uplink channels, that is, only on transmissions from the MS to the BTS.

If encryption is enabled for Emergency Services Calls, then collection can only occur on the SDCCH, because the TCH assignment information, although transmitted to the mobile, is sent after encryption is enabled, preventing an overlay solution from reading this channel information.

Traffic Channel (TCH) Detection

The WLS for myriad reasons may not be able to locate the MS to the required accuracy using uplink SDCCH messaging alone. If emergency services calls are not encrypted, and the WLS Sensor is capable of monitoring and demodulating the downlink SDCCH, the WLS may determine the TCH assignment from the downlink SDCCH "Assignment Command" message and forward the TCH information to the SMLC for delivery to co-operating LMUs. Once tuned to the TCH, the LMU cluster would collect the mobile's RF transmissions for 1 to 5 seconds as determined from the location accuracy requirement.

The preferred embodiment of the invention disclosed herein offers advantages over other techniques for locating wireless telephones. For example, some of these other techniques involve adding GPS or E-OTD functionality to telephones, which requires that hardware and/or software changes be made to the telephones. The preferred embodiment of the present invention, as described below, does not require any changes to wireless telephones, or Mobile Stations in the vernacular of the GSM standard, and so they can be used in connection with the current installed base of wireless telephones both in the U.S. and worldwide. In addition, the preferred embodiment can be implemented without modification to existing GSM wireless communications infrastructure.

Other features of the present invention are described below.

DETAILED DESCRIPTION OF PREFERRED EMBODIMENTS

Overview

As mentioned above, the present invention is particularly directed to a network overlay solution for a GSM communications network. The GSM network is fully specified by the European Telecommunications Standards Institute (ETSI) and extended by the 3rd Generation Partnership Project since December 1998. Detailed descriptions of Radio messages, message elements, and parameters can be found in the specification GSM 04.08 or in UMTS documents 24.008 and 44.018. Message names used herein are as per GSM 04.08 Phase 2+ Version 7.4.2 Release 1998.

In a fully integrated, GSM specification-compliant Location Services solution, the SMLC (Serving Mobile Location Center) depends on the existing BSC (Base Station Controller) or PCU (Packet Control Unit) to provide RF assignment information for the MS (Mobile Station, i.e., the mobile unit to be located). By modifying the LMU to monitor the uplink and or downlink control channels, it is possible to implement an emergency-only overlay location solution that satisfies the FCC's E911 mandate and does not require any modifications to the existing GSM handsets or network. A preferred architecture for such a solution is illustrated in FIG. 1.

Figure 1:
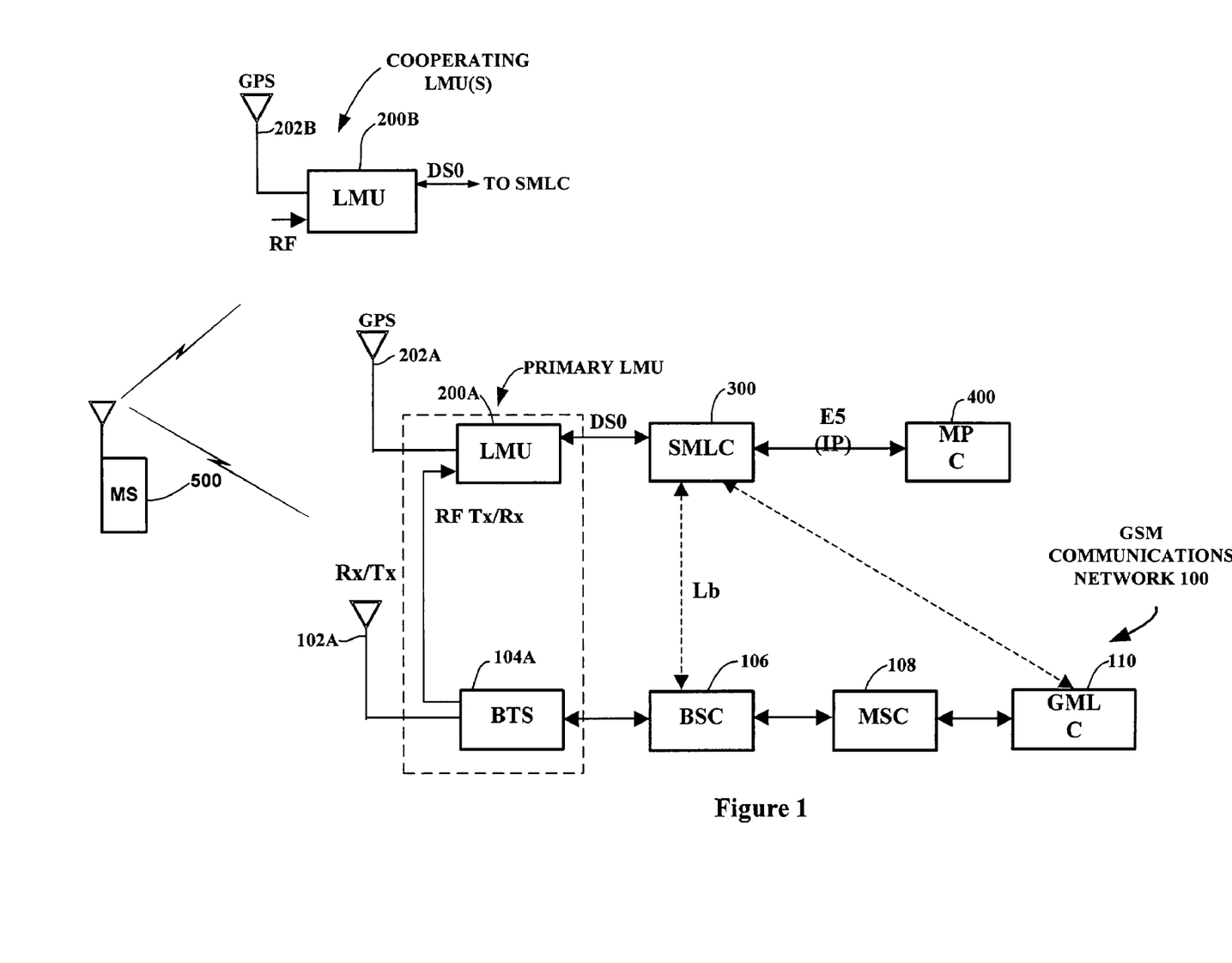
FIG. 1 schematically depicts a WLS in accordance with the present invention.

As shown in FIG. 1, a presently preferred implementation of the inventive E911 overlay solution comprises the following elements:

1. A GSM communications network 100, including receive/transmit antennae 102A coupled to a Base Transceiver Station (BTS) 104A; a Base Station Controller (BSC) 106; a Mobile Switching Center (MSC) 108; and a Gateway Mobile Location Center (GMLC) 110. All of these components and subsystems are well known in the art. See, e.g., 3GPP TS 03.71 V8.6.0 (2002-06).

2. A Location Measuring Unit (LMU) 200A, which as indicated by the dashed line may be co-located with the BTS 104A, so as to share antennae 102A for receiving RF signals from the Mobile Stations. The LMU 202A includes an internal GPS receiver (not shown) and so a GPS antenna 202A is also provided. The LMU may also provide the ability to monitor and demodulate the forward channel signals transmitted by the BTS to the MS. This forward link monitor port may be connected to a separate antenna, or directly to the BTS forward link path. In addition, as shown and as discussed further below, the system is configured such that, for a given call, there will be a Primary LMU, in this case LMU 200A, and one or more Cooperating LMUs, e.g., the LMU designated 200B. The Cooperating LMUs are generally configured the same as the Primary LMU, and so they are coupled to a GPS antenna 202B and are typically co-located with a BTS.

3. The LMUs are coupled to a Serving Mobile Location Center (SMLC) 300, which in turn is coupled to a Gateway Mobile Location Center (GMLC) or Mobile Positioning Center (MPC) 400. The concept of the LMU, SMLC, GMLC, and MPC are well known, as can be seen from the above-cited GSM specification documents.

4. FIG. 1 also shows a Mobile Station 500. Of course, there will typically be many such units in operation within a geographic region, and more than one may be engaged in an emergency call at a given time.

The following sections describe a sequence of radio messages sent between the MS and BTS for an emergency services GSM call using the normal setup procedure, a sequence of radio messages sent between the MS and BTS for an emergency services GSM call using the emergency setup procedure, message exchanges to identify the TCH assignment information and provide the same to cooperating LMUs, delivery of location information to the GMLC/MPC, and an encryption process. These sections refer to FIGS. 2 through 6, respectively, in which lower case alphabetic characters (a, b, c, etc.) are used to refer to steps of the depicted message sequences.

Figure 2:
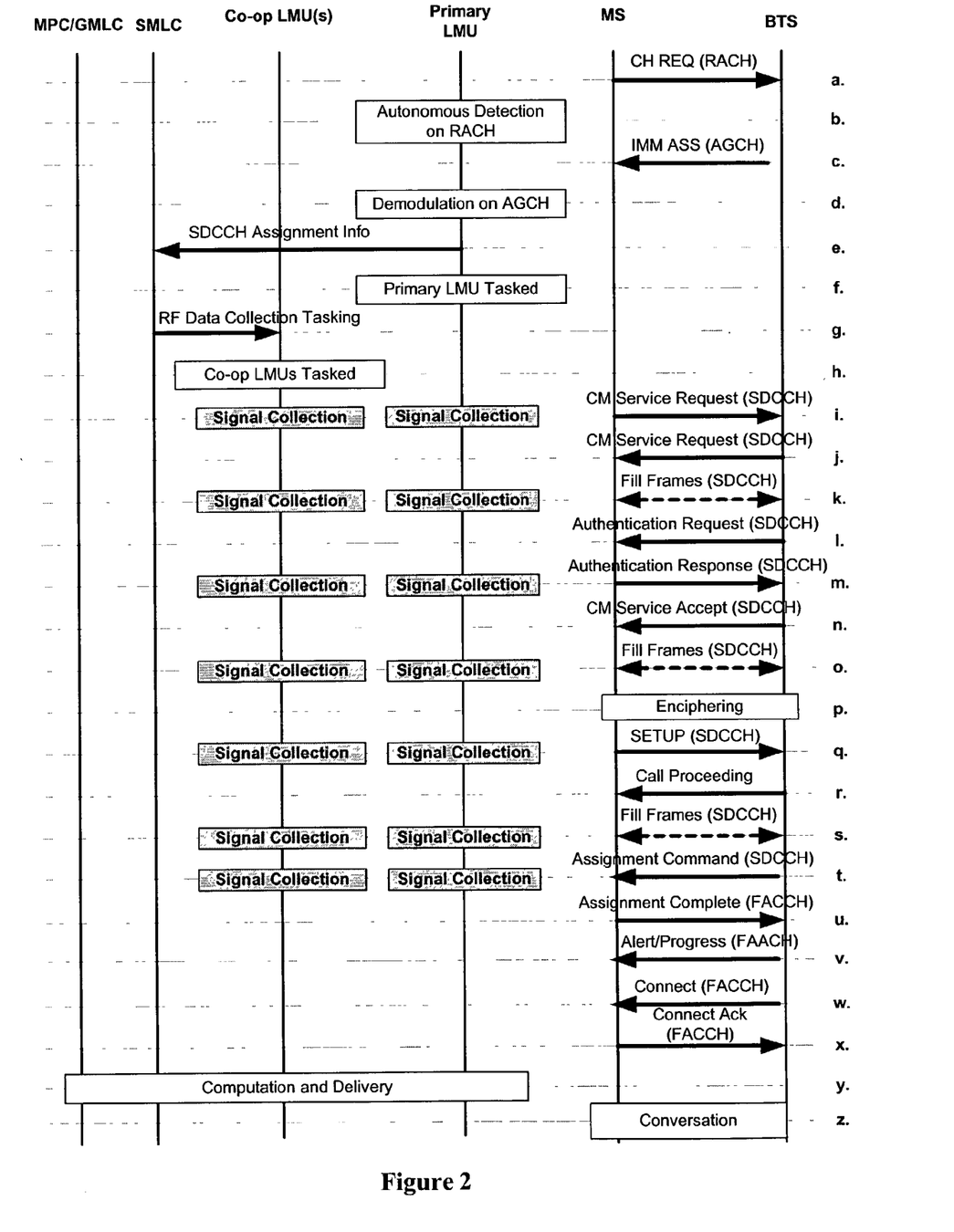
FIG. 2 depicts the sequence of radio messages sent between the MS and BTS for an emergency services GSM call using the normal setup procedure (as per ESTI specifications).

Details of Normal GSM Call Setup (FIG. 2)

a. Channel Request—This radio message is sent on the Random Access Channel to notify the system that the mobile station requires system access. In an Emergency Services call, the establishment cause of value of "101" denotes an emergency services call (full establishment cause field is "101xxxxx" where x can be any pattern of 0 or 1 bits and 101 refers to bits 8, 7 and 6).

b. The primary LMU uplink RACH monitor determines that an emergency call is in progress from reception of the Channel Request message with establishment cause of "Emergency Services Call"

c. Immediate Assignment—This radio message is sent in response to the RACH Channel Request Message. Sent on the Access Grant Channel (AGCH) this message contains both the Stand Alone Dedicated Control Channel (SDCCH) assignment and a copy of the original Channel Request message. The assigned SDCCH is to be used by the mobile to complete call setup.

d. The Primary LMU monitors and demodulates the AGCH Immediate Assignment message and obtains the SDCCH. Optionally the establishment cause is used by the Primary LMU to identify the Emergency Services Call in progress.
e. SDCCH assignment information is forwarded to the SMLC from the Primary LMU.
f. Primary LMU begins uplink SDCCH signal collection.
g. Tasking information including the SDCCH assignment information is distributed to the likely co-operating LMUs.
h. All LMUs in the cooperating cluster begin uplink SDCCH signal collection, collecting the energy of a subset or all of the SDCCH bursts in the call setup. These bursts include those used to transmit messages as well as fill frames.
i. CM Service Request—The mobile informs the system that the mobile station requires system access using the assigned SDCCH. In an Emergency Services call, the service type information element is set to 0010 indicating an Emergency Call Establishment. This is the first uplink SDCCH message for the tasked LMUs to collect.
j. CM Service Request—The system echoes back the CM Service Request to the MS.
k. Fill Frames—The BTS and MS communicate to maintain the SDCCH link. The LMU cluster (Primary and Co-operating) collects uplink Fill Frames.
l. Authentication Request—Downlink SDCCH message.
m. Authentication Response—Uplink SDCCH message.
n. CM Service Accept—Downlink SDCCH message.
o. Fill Frames—Fill Frames—The BTS and MS communicate to maintain the SDCCH link. The LMUs in the cooperating cluster collect uplink Fill Frames.
p. The cipher mode may be optionally set in an emergency services call. See FIG. 6.
q. SETUP—The uplink SDCCH message is collected by the LMU. (The Setup message may include emergency dialed digits. If the call is not encrypted, the dialed digits (9-1-1 or 1-1-2 for example) can be used to determine the emergency call in progress.
r. Call Proceeding—Downlink SDCCH message.
s. Fill Frames—Fill Frames—The BTS and MS communicate to maintain the SDCCH link.
t. Assignment Command—Final Downlink SDCCH call setup message. Contains TCH channel assignment information. The LMU can determine TCH assignment if ciphering is not enabled for the emergency services call.
u. Assignment Complete—Uplink FAACH message.
v. ALERT/Progress—downlink FACCH message.
w. Connect—downlink FACCH. Message.
x. Connect Acknowledgement—uplink FAACH message, collection is still possible if encryption is disabled and the LMU has determined the TCH assignment.
y. Accumulation, Computation and Delivery (see FIG. 5)
z. At this point the call is in Conversation state, a TCH location is possible at this point if the TCH assignment was determined.

Figure 3:
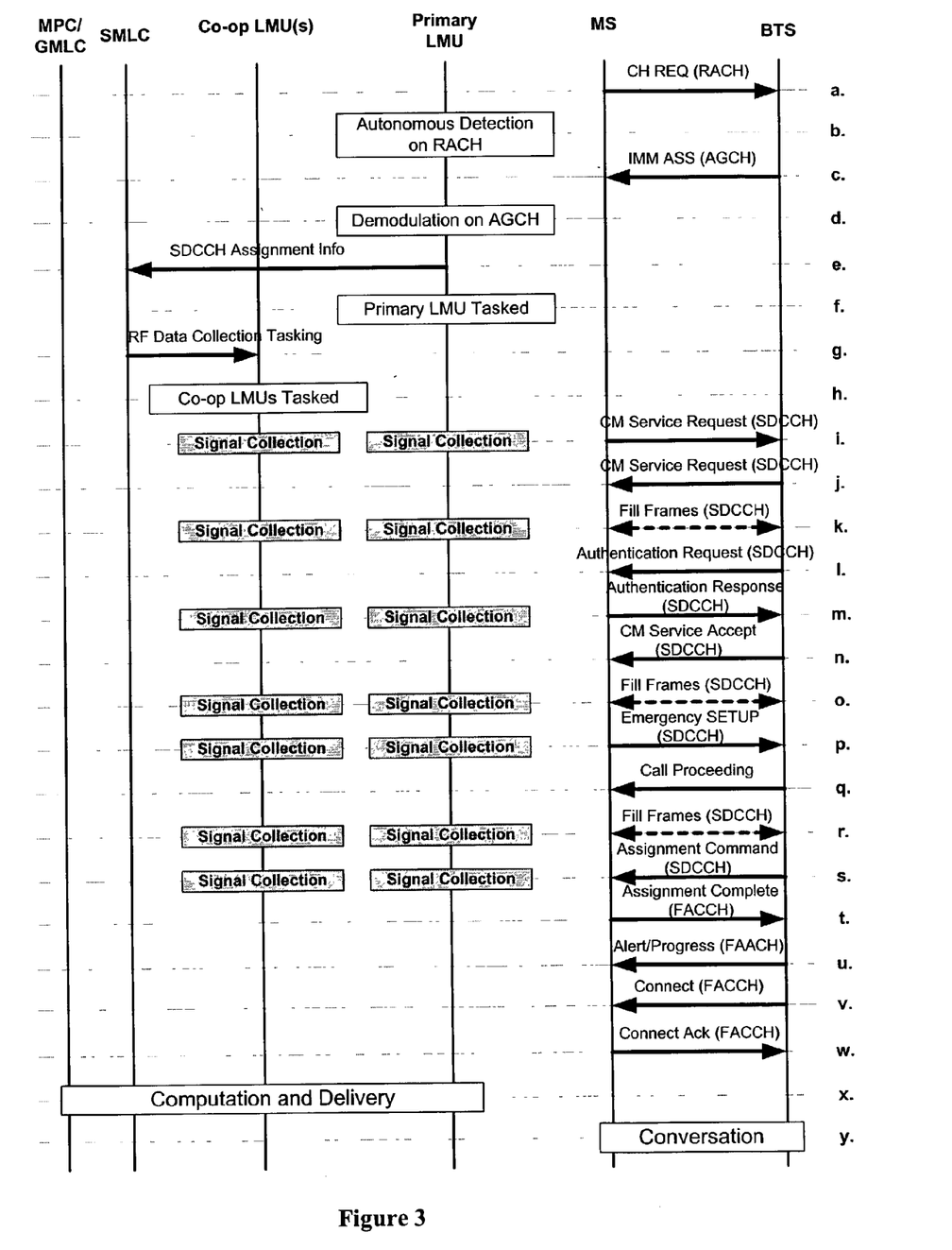
FIG. 3 depicts the sequence of radio messages sent between the MS and BTS for a emergency services GSM call using the emergency setup procedure (also as per ESTI specifications).
Figure 4:
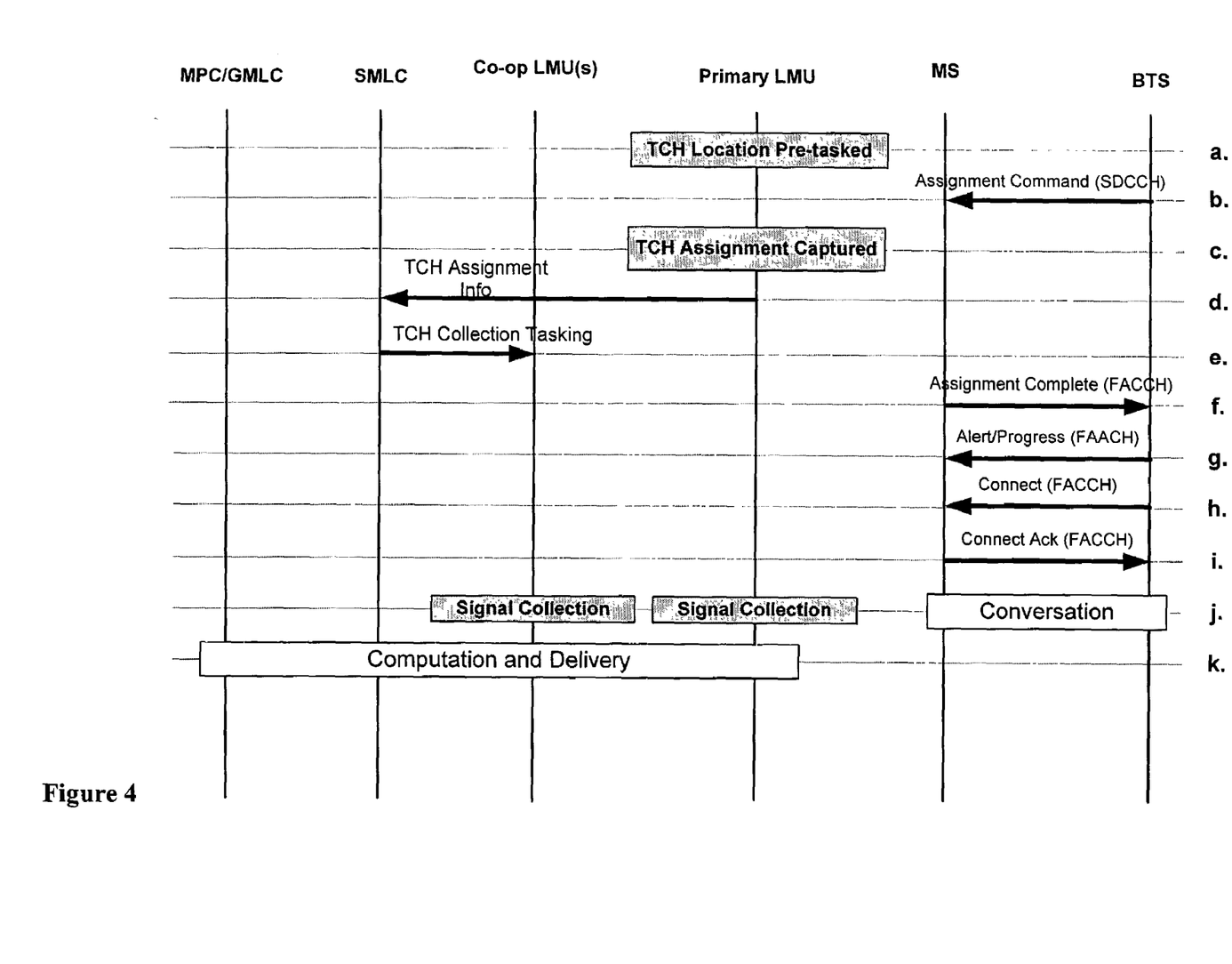
FIG. 4 shows the message exchanges to identify the TCH assignment information and provide it to the cooperating LMUs (also as per ESTI specifications).
Figure 5:
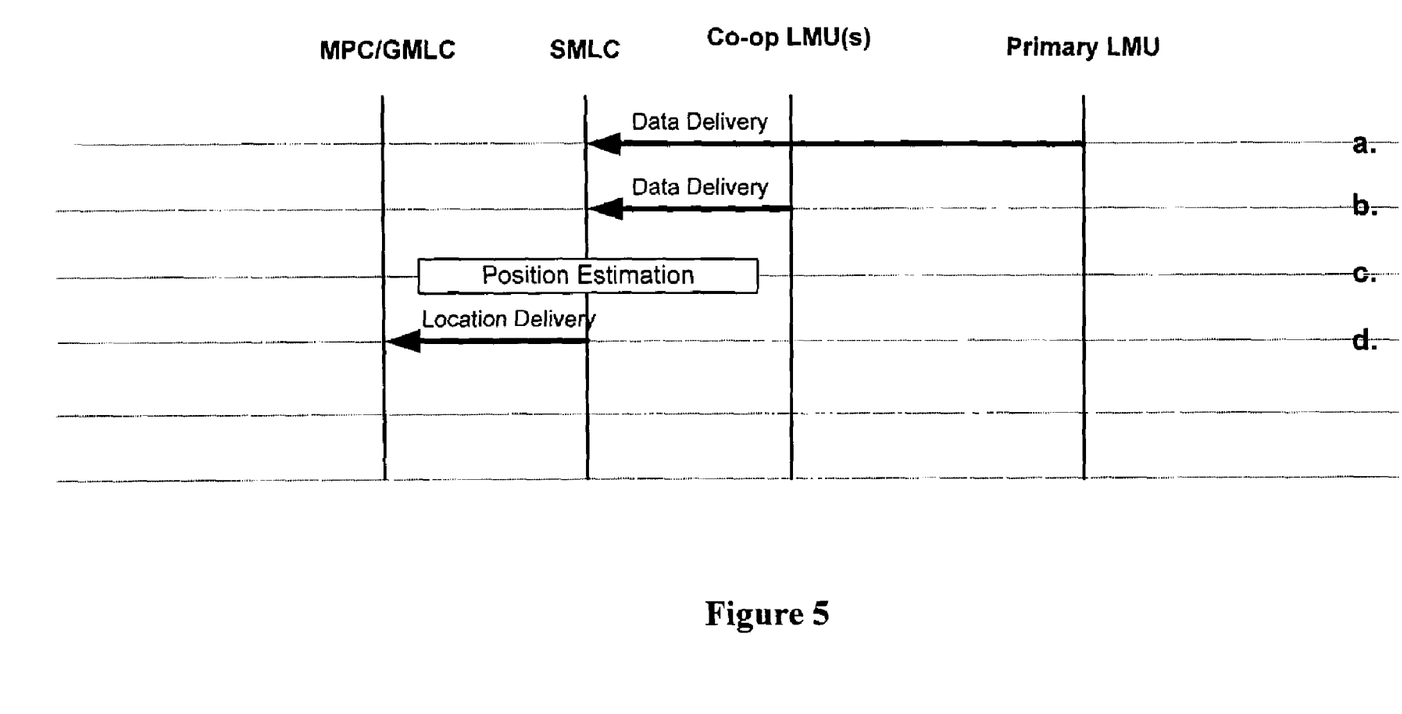
FIG. 5 depicts the delivery of location information to the GMLC/MPC.

Details on Emergency Setup Call Flows (FIG. 3)

FIG. 3 shows the basic radio message flow for an emergency services GSM call setup. In this scenario, the network does not authenticate the mobile, nor is voice encryption enabled at the mobile.

a. Channel Request—This radio message is send on the Random Access Channel to notify the system that the mobile station requires system access. In an Emergency Services call, the establishment cause of value of "101" denotes an emergency services call.
b. The primary LMU uplink RACH monitor determines that an emergency call is in progress from reception of the Channel Request message with establishment cause of "Emergency Services Call"
c. Immediate Assignment—This radio message is sent in response to the RACH Channel Request Message. Sent on the Access Grant Channel (AGCH) this message contains both the Stand Alone Dedicated Control Channel (SDCCH) assignment and a copy of the original Channel Request message. The assigned SDCCH will then be used by the mobile to complete call setup.
d. The Primary LMU monitors and demodulates the AGCH Immediate Assignment message and obtains the SDCCH. Optionally the establishment cause is used by the Primary LMU to identify the Emergency Services Call in progress.
e. SDCCH assignment information is forwarded to the SMLC from the Primary LMU.
f. Primary LMU begins uplink SDCCH signal collection.
g. Tasking information including the SDCCH assignment information is distributed to the likely co-operating LMUs.
h. All LMUs in the cooperating cluster begin uplink SDCCH signal collection, collecting the energy of a subset or all of the SDCCH bursts in the call setup. These bursts include those used to transmit messages as well as fill frames.
i. CM Service Request—The mobile informs the system that the mobile station requires system access using the assigned SDCCH. In an Emergency Services call, the service type information element is set to 0010 indicating an Emergency Call Establishment. This is the first uplink SDCCH message for the tasked LMUs to collect.
j. CM Service Request—The system echoes back the CM Service Request.
k. Fill Frames—The BTS and MS communicate to maintain the SDCCH link. The LMU cluster (Primary and Co-operating) collects uplink Fill Frames.
l. CM Service Accept—Downlink SDCCH message.
m. Fill Frames—Fill Frames—The BTS and MS communicate to maintain the SDCCH link.
n. Emergency SETUP—The uplink SDCCH message is collected by the LMU. Use of this message is optional for GSM carriers. This message also contains the dialed digit string for an emergency services call (9-1-1, 1-1-2 for example).
o. Call Proceeding—Downlink SDCCH message.
p. Fill Frames—Fill Frames—The BTS and MS communicate to maintain the SDCCH link.
q. Assignment Command—Final Downlink SDCCH message call setup message. Contains TCH channel assignment information. The LMU can determine TCH assignment since ciphering is not enabled for the emergency services call.
r. Assignment Complete—Uplink FAACH message.
s. ALERT/Progress—downlink FACCH message.
t. Connect—downlink FACCH. Message.
u. Connect Acknowledgement—uplink FAACH message, the LMU collects additional radio energy using the already determined TCH assignment.
v. Accumulation, Computation and Delivery (see FIG. 5).
w. At this point the call is in Conversation state, a TCH location is possible at this point. (see FIG. 4).

Figure 6:
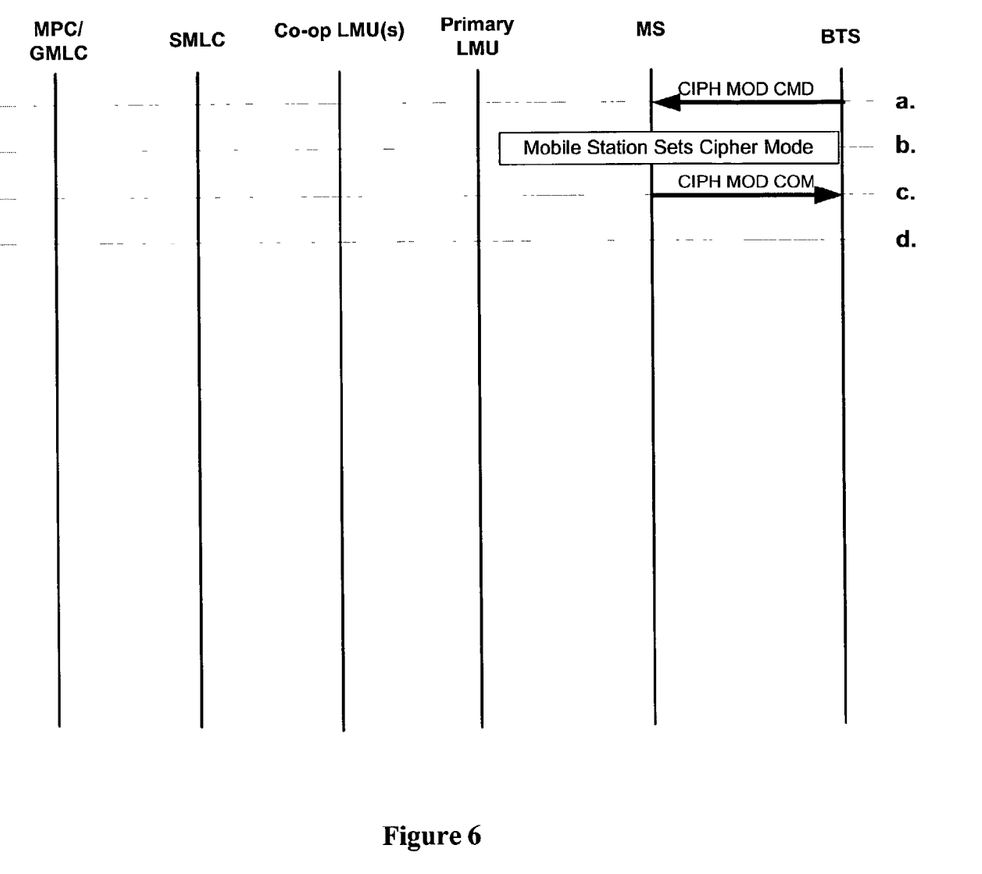
FIG. 6 depicts the encryption process.

Traffic Channel Data Collection (FIG. 4)
a. The primary LMU must be pre-tasked and the GSM must not cipher emergency services calls to determine the TCH assignment.
b. Assignment Command—Final Downlink SDCCH message call setup message.
c. The Primary LMU determines the TCH assignment information from the unencrypted Assignment command message.
d. TCH assignment information determined by primary LMU sent to the SMLC for distribution.
e. SMLC determines appropriate cooperating LMUs and then sends tasks those LMUs to collect radio data from TCH channel.
f. Assignment Complete—Uplink FAACH message. The LMU cluster may collect signal information if tasking is complete.
g. ALERT/Progress—downlink FACCH message.
h. Connect—downlink FACCH. Message.
l. Connect Acknowledgement—uplink FAACH message, The LMU cluster may collect signal information if tasking is complete.
j. The call is now in conversation state and the LMU cluster collects signal information from the traffic channel.
k. Accumulation, Computation and Delivery (see FIG. 5)
Accumulation Computation and Delivery (FIG. 5)
a. Data Delivery—Once sufficient data has been collected or the mobile has moved into the conversation state, the Primary LMU delivers collected and compressed radio data to the SMLC.
b. Data Delivery—Once sufficient data has been collected or the mobile has moved into the conversation state, the Co-operating LMUs deliver their collected and compressed radio data to the SMLC.
c. The SMLC performs signal processing on the collected data. TDOA, FDOA and/or AoA calculations are performed.
d. Location Delivery—The SMLC delivers the position estimate to the Mobile Positioning Center (MPC) or Gateway Mobile Location Center (GMLC).
Cipher Mode Messaging (FIG. 6)
FIG. 6 depicts the sequence of optional encrypting messaging used by a GSM network to ensure subscriber voice privacy. Ciphering of the TCH transmission is optional for emergency services calls.
a. CIPHERING MODE COMMAND—The network informs the mobile station that enciphering mode is mandated.
b. The Mobile Station sets its ciphering mode
c. CIPHERING MODE COMPLETE—The mobile station responds to the network that ciphering mode is set. The message itself is encrypted.

Thus, the inventive solution uses LMU, SMLC and WLG (Wireless Location Gateway) equipment as may be used in a solution for TDMA. No additional equipment is required in markets equipped with the TDMA solution. This solution also obviates the need for near term LCS (Location Services) upgrades to the existing GSM network (MS, BTS, BSC, MSC and GMLC).

By monitoring the downlink control channels, the LMU in accordance with the present invention can determine which call originations are for E911 emergencies and which SDCCH, TCH and SACCH channels are subsequently assigned. Capturing the energy on the call setup channel (SDCCH) and its associated SACCH will typically provide a sub-100 meter level of accuracy. If not, the SMLC can redirect the LMUs to the assigned traffic channel (TCH) in order to capture additional RF energy and improve the location accuracy as required.

Discussion of Methodology

The approach of the present invention takes advantage of the fact that several messages in the GSM emergency call setup, which are transmitted without encryption or ciphering, contain an emergency flag, allowing the triggering of location processing. In addition, the SDCCH assignment information is transmitted without encryption on the AGCH, and the TCH assignment information may be transmitted without encryption on the SDCCH, allowing the LMUs to be tuned to collect the relevant channel energy for the emergency call. Channel Request messages on the RACH include an information element that is used to indicate emergency calls. The Immediate Assignment commands on the Access Grant Channel include an information element that is used to indicate emergency calls. The Immediate Assignment command actually echoes the Channel Request message received by the network on the RACH. CM Service Request messages occurring on both the uplink and downlink channels of the SDCCH include an information element indicating emergency call. Analysis of protocol analyzer traces of the air interface indicates that the call setup phase on the SDCCH typically lasts 1.8–2.0 seconds. During this period, 8 SDCCH messages and 4 SACCH will typically be received by the LMU 200A. This includes the Fill Frames that should be transmitted on the SDCCH and SACCH when messaging information between the MS and BTS is not currently available. In most cases, the SDCCH messaging traffic will be sufficient to provide a location with an accuracy of better than 100 meters. When the analysis of the SDCCH traffic does not yield the required level of location accuracy, the LMU can continue to monitor the MS on the assigned Traffic Channel (TCH). The primary LMU 200A will continue to demodulate the SDCCH messages throughout the call setup process and forward them to the SMLC 300. The Assignment Command on the SDCCH provides sufficient information for the SMLC to re-task the primary and cooperating LMUs to monitor the uplink transmission of the MS on the assigned Traffic Channel (TCH) for one to five seconds in order to obtain the required level of location accuracy.

The location process involves the following steps:
1. The primary LMU identifying an emergency (e.g., 911) call, which can be accomplished by one of several ways:
    a. Monitoring the uplink RACH for Channel Request messages with establishment cause set to "101" indicating an emergency call establishment.
    b. Monitoring the downlink AGCH for Immediate Assignment which includes the same Channel Request messaging with the establishment cause set to "101" indicating an emergency call establishment
    c. Monitoring the uplink SDCCH for CM Service Request messages, with the service type information element is set to 0010 indicating an Emergency Call Establishment.
    d. Monitoring the downlink SDCCH for the same CM Service Request message echoed back to the MS, with the service type information element is set to 0010 indicating an Emergency Call Establishment.
    e. Monitoring the uplink SDCCH for the Setup Message containing dialed digits corresponding to an emergency call.
    f. Monitoring the uplink SDCCH for the Emergency Setup message only used for emergency calls.

2. The primary LMU optionally identifying the SDCCH channel assignment information by one of several ways:
   a. Monitoring the AGCH for Immediate Assignment messages.
   b. Monitoring all of the SDCCH assignment messages then the SDCCH which is used to set up an emergency call is the one in which signal collection should occur. SDCCHs are normally limited in number and each SDCCH could be monitored by the LMU if the static channel information was available.
3. The Primary LMU forwarding the SDCCH assignment info to the SMLC.
4. The SMLC providing the SDCCH assignment to the information to the cooperating LMUs. The cooperating LMUs tuning the receiver to collect energy on the assigned SDCCH.
5. The primary LMU optionally identifying the assigned traffic channel (TCH) by monitoring the SDCCH for the Assignment Command.
   a. Provisioning emergency calls to not use encryption so that the TCH assignment can be decoded by the LMU.
6. The Primary LMU forwarding the TCH assignment info to the SMLC.
7. The SMLC providing the TCH assignment to the information to the cooperating LMUs. The LMUs tuning the receiver to collect energy on the assigned TCH.
8. The WLS using the collected data to complete a location using TDOA, FDOA, and/or AOA techniques.

Conclusion

The true scope the present invention is not limited to the presently preferred embodiments disclosed herein. For example, the foregoing disclosure of a presently preferred embodiment of a Wireless Location System uses explanatory terms, such as LMU, BTS, BSC, SMLC, and the like, which should not be construed so as to limit the scope of protection of the following claims, or to otherwise imply that the inventive aspects of the Wireless Location System are limited to the particular methods and apparatus disclosed. Moreover, as will be understood by those skilled in the art, many of the inventive aspects disclosed herein may be applied in location systems that are not based on TDOA techniques. In such non-TDOA systems, the SMLC described above would not be required to perform TDOA calculations. Similarly, the invention is not limited to systems employing LMUs constructed in a particular manner, nor to systems employing specific types of receivers, computers, signal processors, etc. The LMUs, SMLC, etc., are essentially programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the SMLC) described herein to another functional element (such as the LMU) without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

We claim:

1. A wireless location system overlaid on a GSM or UMTS wireless communications system, comprising:
   first and second location measuring units (LMUs) for collection of a mobile transmitter's radio emissions, wherein each of said first and second LMUs is co-located and shares an RF antenna with a base transceiver station (BTS) of said wireless communications system;
   a sensor, operatively coupled to said first LMU, for monitoring of control channel messages for emergency call detection and channel allocation; and
   a central processor, operatively coupled to said first and second LMUs, for the tasking of LMUs and computation of the mobile transmitter's position.

2. A system as recited in claim 1, said sensor comprising a mechanism for monitoring uplink control channels.

3. A system as recited in claim 2 wherein the sensor is operative to obtain a Standalone Dedicated Control Channel assignment for an emergency call by monitoring uplink Standalone Dedicated Control Channels for an Emergency SETUP message, while tracking the channel assignment information for all Standalone Dedicated Control Channels.

4. A system as recited in claim 1, said sensor comprising a mechanism for monitoring downlink control channels.

5. A system as recited in claim 1, said sensor comprising a mechanism for monitoring both uplink and downlink control channels.

6. A system as recited in claim 1 wherein the sensor is co-located with an LMU.

7. A system as recited in claim 1 wherein the sensor is located independently of an LMU.

8. A system as recited in claim 1, said sensor comprising a mechanism for detecting the emergency call from a Channel Request message on an uplink Random Access Channel with an establishment cause field set to indicate an emergency call.

9. A system as recited in claim 1, said sensor comprising a mechanism for detecting the emergency call from an Immediate Assignment message on a downlink Access Grant Channel, where the enclosed establishment cause field is set to indicate an emergency call.

10. A system as recited in claim 1, said sensor comprising a mechanism for detecting the emergency call from a CM Service Request on an uplink Standalone Dedicated Control Channel with an establishment cause field set to indicate an emergency call.

11. A system as recited in claim 1, said sensor comprising a mechanism for detecting the emergency call from a CM Service Request on a downlink Standalone Dedicated Control Channel with an establishment cause field set to indicate an emergency call.

12. A system as recited in claim 1, said sensor comprising a mechanism for detecting the emergency call from a SETUP message on a Standalone Dedicated Control Channel where dialed digits correspond to an emergency services call.

13. A system as recited in claim 1, said sensor comprising a mechanism for detecting the emergency call from the use of the Emergency SETUP message on a Standalone Dedicated Control Channel.

14. A system as recited in claim 1, further comprising a mechanism to effect disabling of ciphering for emergency calls so that an assigned Traffic Channel can be determined by monitoring a downlink Standalone Dedicated Control Channel.

15. A system as recited in claim 1 wherein the sensor is operative to obtain a Standalone Dedicated Control Channel assignment from an Immediate Assignment message on a downlink Access Grant Channel.

16. A system as recited in claim 1 wherein the sensor is operative to obtain a Standalone Dedicated Control Channel assignment for an emergency call by monitoring uplink Standalone Dedicated Control Channels for a CM Service Request message with an establishment cause field set to indicate an emergency call, while tracking the channel assignment information for all Standalone Dedicated Control Channels.

17. A system as recited in claim 1 wherein the sensor is operative to obtain a Standalone Dedicated Control Channel assignment for an emergency call by monitoring downlink Standalone Dedicated Control Channels for a CM Service Request message with an establishment cause field set to indicate an emergency call, while tracking the channel assignment information for all Standalone Dedicated Control Channels.

18. A system as recited in claim 1 wherein the sensor is operative to obtain the Standalone Dedicated Control Channel assignment for an emergency call by monitoring uplink Standalone Dedicated Control Channels for a SETUP message with dialed digits indicating an emergency call, while tracking the channel assignment information for all Standalone Dedicated Control Channels.

19. A system as recited in claim 1 wherein the sensor is operative to obtain a Standalone Dedicated Control Channel assignment for an emergency call by monitoring uplink Standalone Dedicated Control Channels for an Emergency SETUP message, while tracking the channel assignment information for all Standalone Dedicated Control Channels.

20. A system as recited in claim 1 wherein the sensor communicates a Standalone Dedicated Control Channel assignment to the central processor so that LMUs may be tasked to collect signaling on that channel.

21. A system as recited in claim 1 wherein the sensor is operative to obtain a Traffic Channel assignment for an emergency services call from an Assignment Command message on a downlink Standalone Dedicated Control Channel.

22. A system as recited in claim 1 wherein the sensor communicates a Traffic Channel assignment to the central processor so that LMUs may be tasked to collect signals on that channel.

23. A system as recited in claim 1 comprising Angle of Arrival algorithms for use in the computation of position estimates Angle of Arrival algorithms.

24. A system as recited in claim 23 comprising Frequency Difference of Arrival algorithms.

25. A system as recited in claim 1 comprising Time Difference of Arrival algorithms for use in the computation of position estimates.

26. A system as recited in claim 24 comprising Frequency Difference of Arrival algorithms.

27. A system as recited in claim 1 comprising Angle of Arrival and Time Difference of Arrival algorithms for use in the computation of position estimates.

28. A system as recited in claim 27 comprising Frequency Difference of Arrival algorithms.

29. A method for use in a wireless location system comprising a plurality of location measuring units (LMUs) that are co-located and share an RF antenna with a corresponding base transceiver station (BTS) of a GSM or UMTS wireless communications system, comprising:
monitoring uplink and downlink control channel messages for emergency call detection and channel allocation, said monitoring including the detection of at least one pre-defined control channel message indicative of an emergency call being initiated by a mobile transmitter, and the detection of at least one additional message indicative of channel assignment information for said emergency call;
employing said channel assignment information to tune a plurality of LMUs to the assigned channel for the reception of signals transmitted by said mobile transmitter; and
computing the mobile transmitter's position using the signals received by the plurality of LMUs in conjunction with time difference of arrival (TDOA) and/or angle of arrival (AOA) algorithms.

30. A method as recited in claim 29 wherein said monitoring further comprises use of a sensor that is co-located with an LMU.

31. A method as recited in claim 29 wherein said monitoring further comprises use of a sensor that is located independently of an LMU.

32. A method as recited in claim 29 wherein said monitoring further comprises detecting the emergency call from the Channel Request message on an uplink Random Access Channel with an establishment cause field set to indicate an emergency call.

33. A method as recited in claim 29 wherein said monitoring further comprises detecting the emergency call from an Immediate Assignment message on a downlink Access Grant Channel, where the enclosed establishment cause field is set to indicate an emergency call.

34. A method as recited in claim 29 wherein said monitoring further comprises detecting the emergency call from a CM Service Request on an uplink Standalone Dedicated Control Channel with an establishment cause field set to indicate an emergency call.

35. A method as recited in claim 29 wherein said monitoring further comprises detecting the emergency call from a CM Service Request on a downlink Standalone Dedicated Control Channel with an establishment cause field set to indicate an emergency call.

36. A method as recited in claim 29 wherein said monitoring further comprises detecting the emergency call from a SETUP message on a Standalone Dedicated Control Channel where dialed digits correspond to an emergency services call.

37. A method as recited in claim 29 wherein said monitoring further comprises detecting the emergency call from the use of an Emergency SETUP message on a Standalone Dedicated Control Channel.

38. A method as recited in claim 29, further comprising the step of disabling ciphering for emergency calls so that an assigned Traffic Channel can be determined by monitoring a downlink Standalone Dedicated Control Channel.

39. A method as recited in claim 29 wherein a Standalone Dedicated Control Channel assignment is obtained from an Immediate Assignment message on a downlink Access Grant Channel.

40. A method as recited in claim 29 wherein a Standalone Dedicated Control Channel assignment is obtained by monitoring uplink Standalone Dedicated Control Channels for a CM Service Request message with an establishment cause field set to indicate an emergency call, while tracking the channel assignment information for all Standalone Dedicated Control Channels.

41. A method as recited in claim 29 wherein a Standalone Dedicated Control Channel assignment is obtained by monitoring downlink Standalone Dedicated Control Channels for a CM Service Request message with an establishment cause field set to indicate an emergency call, while tracking the channel assignment information for all Standalone Dedicated Control Channels.

42. A method as recited in claim 29 wherein a Standalone Dedicated Control Channel assignment is obtained by monitoring uplink Standalone Dedicated Control Channels for a SETUP message with dialed digits indicating an emergency call, while tracking the channel assignment information for all Standalone Dedicated Control Channels.

43. A method as recited in claim 29 wherein a Standalone Dedicated Control Channel assignment is obtained by monitoring uplink Standalone Dedicated Control Channels for an Emergency SETUP message, while tracking the channel assignment information for all Standalone Dedicated Control Channels.

44. A method as recited in claim 29 wherein a Standalone Dedicated Control Channel assignment is obtained by monitoring downlink Standalone Dedicated Control Channels for an Emergency SETUP message, while tracking the channel assignment information for all Standalone Dedicated Control Channels.

45. A method as recited in claim 29 wherein a Standalone Dedicated Control Channel assignment is communicated to a processor so that LMUs may be tasked to collect signaling on that channel.

46. A method as recited in claim 29 wherein a Traffic Channel assignment for an emergency services call is obtained from an Assignment Command message on a downlink Standalone Dedicated Control Channel.

47. A method as recited in claim 29 wherein a Traffic Channel assignment is communicated to a central processor so that LMUs may be tasked to collect signals on that channel.

48. A method as recited in claim 29 wherein the step of position estimation includes Angle of Arrival algorithms.

49. A method as recited in claim 29 wherein the step of position estimation includes Time Difference of Arrival algorithms.

50. A method as recited in claim 49 wherein the computation of position estimation includes Frequency Difference of Arrival algorithms.

51. A method as recited in claim 29 wherein the computation of position estimation includes both Angle of Arrival and Time Difference of Arrival algorithms.

52. A wireless location system (WLS) overlaid on a GSM or UMTS wireless communications system, comprising:
 a first Location Measuring Unit (LMU), which in use is operable as a primary LMU for monitoring a downlink control channel carrying signals from a Base Transceiver Station (BTS) to a first Mobile Station (MS), and from said downlink control channel identifying an E911 call origination from the first MS and identifying call setup (SDCCH), assigned traffic (TCH) and associated channels subsequently assigned to said first MS;
 at least one additional LMU, which in use is operable as a cooperating LMU; and
 a Serving Mobile Location Center (SMLC) for receiving data from the primary and cooperating LMUs and calculating the geographic location of the first MS;
 wherein the primary and cooperating LMUs are operable to capture energy on the uplink call setup channel, SDCCH, and its associated channels, and provide information to the SMLC sufficient to enable the SMLS to calculate the geographic location of the first MS.

53. A WLS as recited in claim 52, wherein the primary LMU is further operable to monitor Channel Request messages on a Reverse Access Channel (RACH) to obtain an information element that indicates that the Channel Request message is for an emergency E911 call.

54. A WLS as recited in claim 52, wherein the associated channel includes a Slow Associated Control Channel (SACCH).

55. A WLS as recited in claim 52, wherein the associated channel includes a Fast Associated Control Channel (FACCH).

56. A WLS as recited in claim 52, wherein the SMLC is operable to redirect one or more LMUs to an assigned traffic channel (TCH) to capture additional RF energy.

57. A WLS as recited in claim 56, wherein the SMLC is operable to redirect said one or more LMUs to the assigned traffic channel only when necessary to improve location accuracy.

58. A WLS as recited in claim 52, wherein the primary LMU is further operable to monitor a downlink Access Grant channel (AGCH) and to capture an Immediate Assignment Message (IMM ASS) for emergency calls.

59. A WLS as recited in claim 58, wherein the Immediate Assignment Message contains the Channel Request message with the emergency call indication and the identifying call setup channel (SDCCH) to be used by the first MS for subsequent call setup messaging.

60. A WLS as recited in claim 58, wherein the primary LMU is further operable to forward the Immediate Assignment Message to the SMLC, and the SMLC is operable to task the cooperating LMUs to collect RF energy from one or more of the call setup (SDCCH), associated (SACCH and/or FACCH) to provide TDOA and FDOA data to the SMLC.

61. A wireless location system (WLS) overlaid on a GSM or UMTS wireless communications system, comprising:
 a first Location Measuring Unit (LMU), which in use is operable as a primary LMU for monitoring a downlink control channel carrying signals from a Base Transceiver Station (BTS) to a first Mobile Station (MS), and from said downlink control channel identifying an E911 call origination from the first MS and identifying call setup (SDCCH), assigned traffic (TCH) and associated channels subsequently assigned to said first MS;
 at least one additional LMU, which in use is operable as a cooperating LMU; and
 a Serving Mobile Location Center (SMLC) for receiving data from the primary and cooperating LMUs and calculating the geographic location of the first MS;
 wherein the primary and cooperating LMUs are operable to capture energy on an uplink call setup channel and its associated channels, and provide information to the SMLC sufficient to enable the SMLS to calculate the geographic location of the first MS; and wherein the WLS is overlaid on the wireless communications system in that each of said first and at least one cooperating LMUs is co-located with a Base Transceiver Station (BTS) and shares an RF antenna of the BTS.

62. A WLS as recited in claim 61, wherein: the primary LMU is further operable to monitor Channel Request messages on a Reverse Access Channel (RACH) to obtain an information element that indicates that the Channel Request message is for an emergency E911 call; the SMLC is operable to redirect one or more LMUs to an assigned traffic channel (TCH) to capture additional RF energy; and wherein the primary LMU is further operable to forward the Immediate Assignment Message to the SMLC, and the SMLC is operable to task the cooperating LMUs to collect RF energy from one or more of the call setup (SDCCH), associated (SACCH and/or FACCH) and assigned traffic (TCH) channels and to provide TDOA and FDOA data to the SMLC.

63. A WLS as recited in claim 62, wherein the primary LMU is further operable to monitor a downlink Access Grant channel (AGCH) and to capture an Immediate Assignment Message (IMM ASS) for emergency calls, wherein the Immediate Assignment Message contains the Channel Request message with the emergency call indication and the identifying call setup channel (SDCCH) to be used by the first MS for subsequent call setup messaging.

64. A wireless location system (WLS) overlaid on a GSM or UMTS wireless communications system, comprising:
- a first Location Measuring Unit (LMU), which in use is operable as a primary LMU for monitoring a control channel carrying signals from or to a Base Transceiver Station (BTS) to or from a first Mobile Station (MS), and from said control channel identifying an E911 call origination from the first MS and identifying call setup (SDCCH), assigned traffic (TCH) and associated channels subsequently assigned to said first MS;
- at least one additional LMU, which in use is operable as a cooperating LMU; and
- a Serving Mobile Location Center (SMLC) for receiving data from the primary and cooperating LMUs and calculating the geographic location of the first MS;
- wherein the primary and cooperating LMUs are operable to capture energy on an uplink call setup channel and its associated channels, and provide information to the SMLC sufficient to enable the SMLS to calculate the geographic location of the first MS; and wherein the WLS is overlaid on the wireless communications system such that each of said first and at least one cooperating LMUs is co-located with a Base Transceiver Station (BTS) and shares an RF antenna of the BTS.

65. A WLS as recited in claim 64 wherein the primary LMU is further operable to monitor Channel Request messages on a Reverse Access Channel (RACH) to obtain an information element that indicates that the Channel Request message is for an emergency E911 call; the SMLC is operable to redirect one or more LMUs to an assigned traffic channel (TCH) to capture additional RF energy; and wherein the primary LMU is further operable to forward the Immediate Assignment Message to the SMLC, and the SMLC is operable to task the cooperating LMUs to collect RF energy from one or more of the call setup (SDCCH), associated (SACCH and/or FACCH) and assigned traffic (TCH) channels and to provide TDOA and FDOA data to the SMLC.

66. A WLS as recited in claim 65 wherein the primary LMU is further operable to monitor a downlink Access Grant channel (AGCH) and to capture an Immediate Assignment Message (IMM ASS) for emergency calls, wherein the Immediate Assignment Message contains the Channel Request message with the emergency call indication and the identifying call setup channel (SDCCH) to be used by the first MS for subsequent call setup messaging.

67. A WLS as recited in claim 64 wherein the primary LMU is further operable to monitor Channel Request messages on a Reverse Access Channel (RACH) to obtain an information element that indicates that the Channel Request message is for an emergency E911 call.

68. A WLS as recited in claim 64 wherein the associated channel includes a Slow Associated Control Channel (SACCH).

69. A WLS as recited in claim 64 wherein the associated channel includes a Fast Associated Control Channel (FACCH).

70. A WLS as recited in claim 64 wherein the SMLC is operable to redirect one or more LMUs to an assigned traffic channel (TCH) to capture additional RF energy.

71. A WLS as recited in claim 70 wherein the SMLC is operable to redirect said one or more LMUs to the assigned traffic channel only when necessary to improve location accuracy.

72. A WLS as recited in claim 64 wherein the primary LMU is further operable to monitor a downlink Access Grant channel (AGCH) and to capture an Immediate Assignment Message (IMM ASS) for emergency calls.

73. A WLS as recited in claim 72 wherein the Immediate Assignment Message contains the Channel Request message with the emergency call indication and the identifying call setup channel (SDCCH) to be used by the first MS for subsequent call setup messaging.

74. A WLS as recited in claim 72 wherein the primary LMU is further operable to forward the Immediate Assignment Message to the SMLC, and the SMLC is operable to task the cooperating LMUs to collect RF energy from one or more of the call setup (SDCCH), associated (SACCH and/or FACCH) to provide TDOA and FDOA data to the SMLC.

* * * * *